March 9, 1971 L. B. MOORE 3,568,242
SAUSAGE CASING SLITTING APPARATUS
Filed June 11, 1969 3 Sheets-Sheet 1

INVENTOR
LOWELL BRUCE MOORE
BY
ATT'YS.

United States Patent Office 3,568,242
Patented Mar. 9, 1971

3,568,242
SAUSAGE CASING SLITTING APPARATUS
Lowell Bruce Moore, Moline, Ill., assignor to
The Kartridg Pak Co., Davenport, Iowa
Filed June 11, 1969, Ser. No. 832,270
Int. Cl. A22c 13/00
U.S. Cl. 17—1                                      6 Claims

ABSTRACT OF THE DISCLOSURE

An apparatus for slitting the casing so as to enable the same to be removed from strings of sausage links wherein a traveling conveyor advances the encased sausages past a slitting knife which is set in a housing with the edge of the blade adjustably positioned in a slot so that it projects a sufficient distance to cut through the casing only and a spring pressed arm is disposed opposite the knife edge with a curved portion over which the sausages ride so that they are pressed against the face of the housing and into engagement with the projecting blade edge as they advance past the same.

---

This invention relates to the manufacture of sausages and like products and is more particularly concerned with improvements in apparatus for slitting the casing or skin so that it may be stripped from a plurality of connected sausage links.

In the manufacture of sausages of various kinds a sausage batter is stuffed into a predetermined length of a suitable sausage casing, which may be formed from a cellulose film or similar material, and the casing is divided into a plurality of individual sausages or links of substantially uniform length, usually by constricting a small section of the casing at suitable intervals. The length of connected links is then processed by cooking, smoking or other treatment so as to prepare the product for marketing, after which the individual links are separated by removing the casing or skin. Several types of machines have been developed for removing the casing from the sausages. One type of machine involves a casing slitting operation which requires passing the links longitudinally beneath a slitting knife with provision for initially separating the casing from the sausages by inflating the same, air being injected through a plow-like nozzle so as to produce a space between the casing and the meat for the knife to enter and slit the casing. To successfully employ this type of casing slitting apparatus, it is necessary to straighten the connecting sections of the casing between the links by untwisting, when the casing is twisted between the links, or by removing the ties, when the links are separated by ties, so that the air plow can pass from one link to the next without rethreading. Machines of this type have been used commercially with considerable success. However, it is recognized that with some products and under certain conditions efficient operation of such machines is impaired, for example, when there are defects in the casings so that the air fails to properly loosen the casing and rethreading is required while a damaged product frequently results. It is a general object of the invention, therefore, to provide a casing slitting mechanism which operates to efficiently slit the casing without damage to the sausage skin and without employing a plow arrangement and air pressure for initially separating the casing from the sausages.

It is a more particular object of the invention to provide a sausage skinning machine which will operate without the use of an air plow and which is adapted to slit the casing which encloses each individual sausage link without the need for eliminating any twisted or tied sections, that is, with the tie or twist in the casing which connects the links being left intact.

It is a further object of the invention to provide an apparatus for removing the casing from a plurality of connected sausage links which comprises a sausage gripping conveyor for advancing the links in a predetermined path to a casing slitting station where a slitting knife is mounted in the slotted face of a housing with the casing slitting edge of the knife projecting a sufficient distance to slit the casing only as the sausages are pressed into engagement with and moved along the slotted face of the housing.

It is a still further object of the invention to provide an apparatus for removing the casing or skin from sausages or similar products which comprises a slitting knife mounted in a slot in an abutment surface at a skinning station along the path of a sausage gripping and conveying means which advances the sausages past the skinning station and over a spring pressed shoe which urges the sausages out of their normal line of advance and into engagement with the slitting knife.

It is another object of the invention to provide a sausage skinning machine wherein the successive links are advanced beneath an anvil-like member having a slot in which a cutting blade is mounted so as to cut through the casing as the sausages are advanced in engagement with the anvil and pressed towards the knife edge by a spring pressed, pivotallp mounted arm with the sausage engaging portion disposed opposite the exposed edge of the slitting blade.

These and other objects and advantages of the invention will be apparent from a consideration of the casing slitting machine which is shown by way of illustration in the accompanying drawings wherein:

FIG. 6 is a fragmentary cross sectional view, to a greatly enlarged scale, showing the operation of the casing slitting blade.

Figure 1:
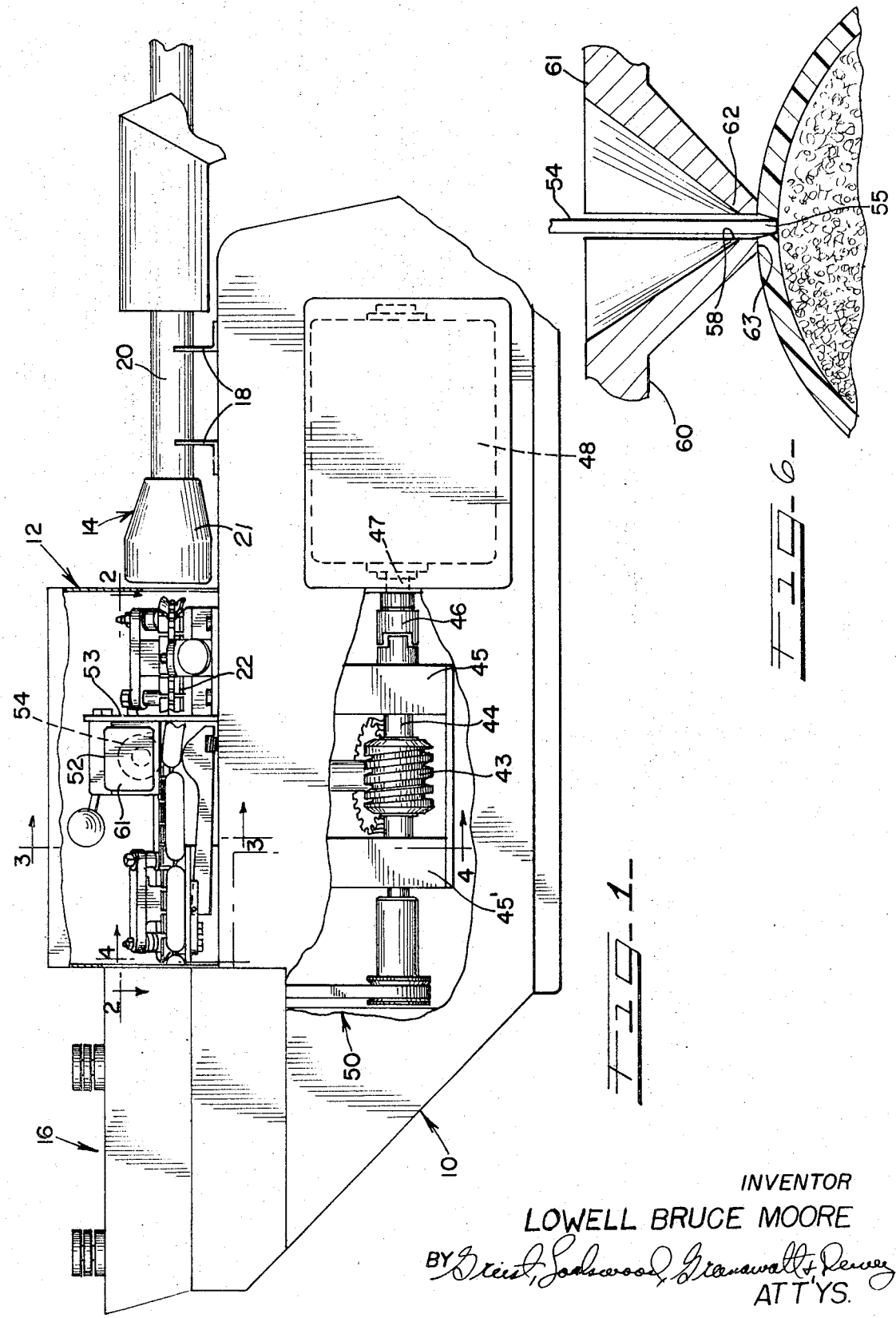
FIG. 1 is a side elevational view, with portions broken away, of a machine for slitting the casing and removing the same from the connected strings of sausages, which incorporates therein the principal features of the invention.

Referring first to FIG. 1, the apparatus illustrated may be supported on a suitable stand or bottom frame (not shown) on the top of which a housing forming base 10 is mounted for supporting a casing slitting mechanism 12 which embodies the present invention. A guide mechanism 14 is supported at the entrance or work receiving end, of the apparatus for guiding a string of sausage links into the casing slitting mechanism 12. A husking or stripping apparatus 16 is mounted at the discharge end of the machine which is adapted to remove the casing from the sausage links after it has been slit longitudinally of the successive links by the slitting mechanism 12. The husking mechanism 16 may be of the type disclosed for this purpose in Doyle Pat. No. 3,390,422 and this part of the apparatus is not shown in detail since it does not constitute part of the present invention. The guide mechanism 14 at the entrance end of the machine may include a steam chamber through which the links are drawn so that drying out of the casing does not occur or so that the moisture content of the same is kept high enough to prevent undue adherence of the casing to the meat surface. A power drive for the mechanism is housed in the base 10 with suitable connections for driving the various mechanisms and suitable electrical lines are provided, as required, for supplying current thereto.

Figure 2:
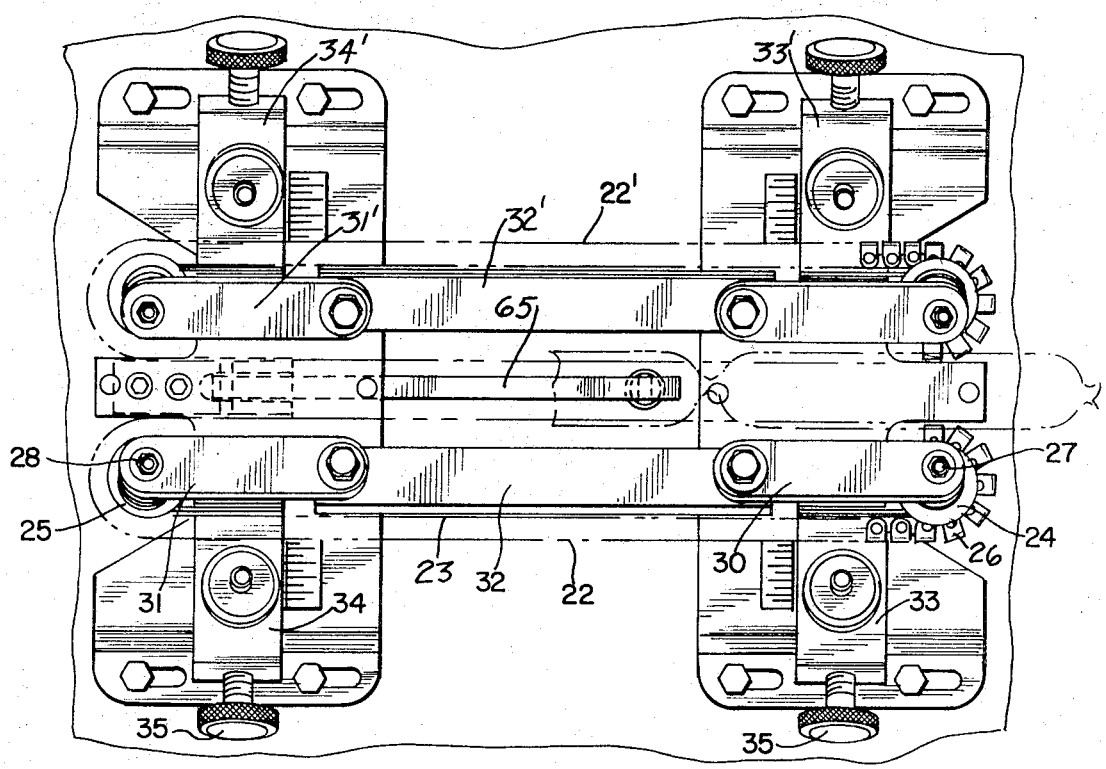
FIG. 2 is a partial longitudinal section taken on the line 2—2 of FIG. 1, to an enlarged scale.
Figure 3:
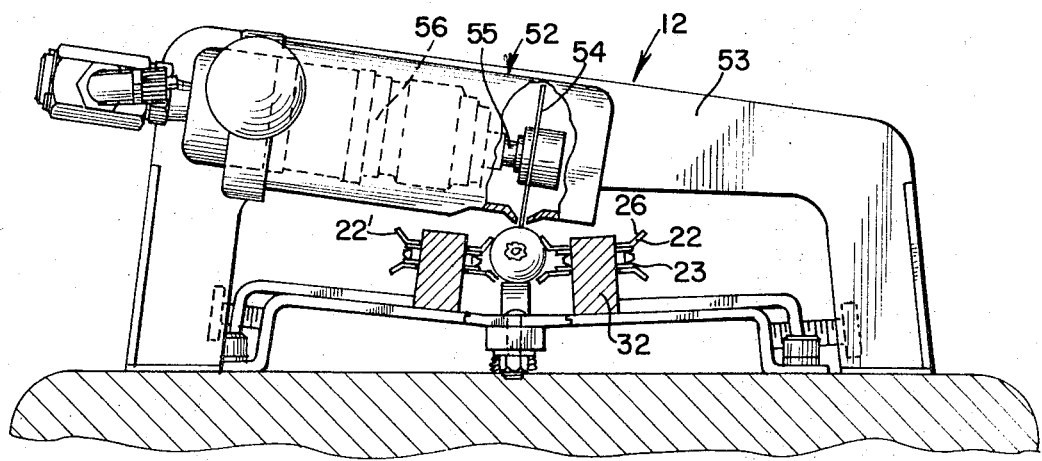
FIG. 3 is a partial cross section taken on the line 3—3 of FIG. 2, to an enlarged scale.
Figure 4:
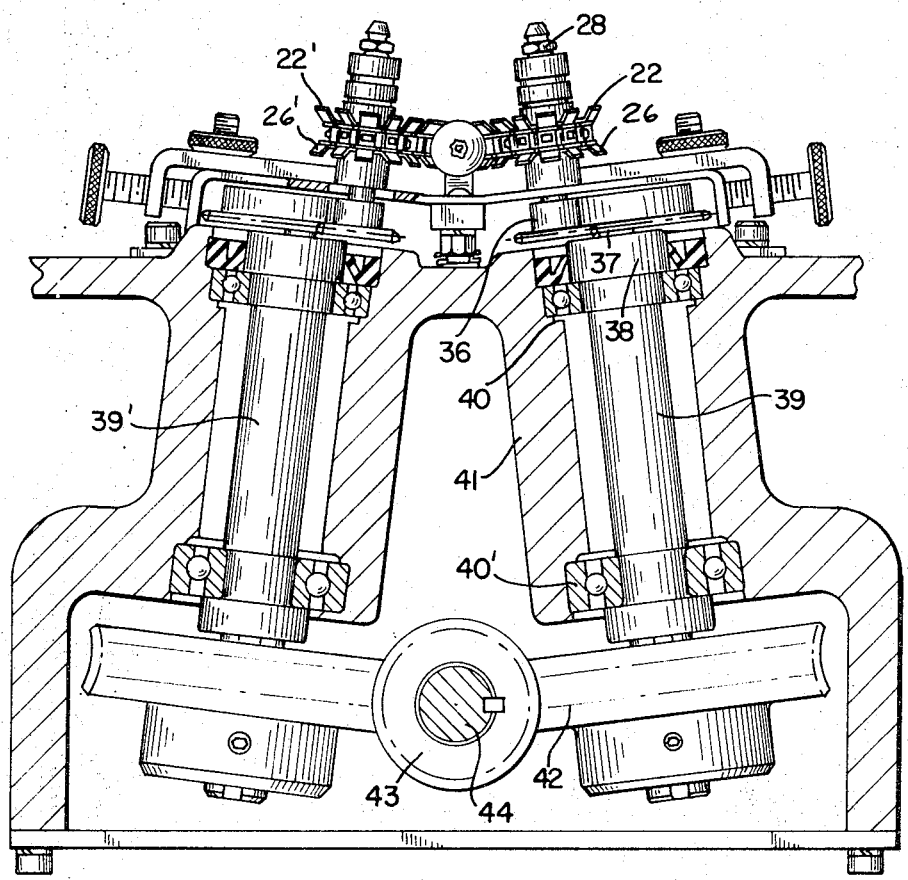
FIG. 4 is a partial section taken on the line 4—4 of FIG. 1, to an enlarged scale.
Figure 5:
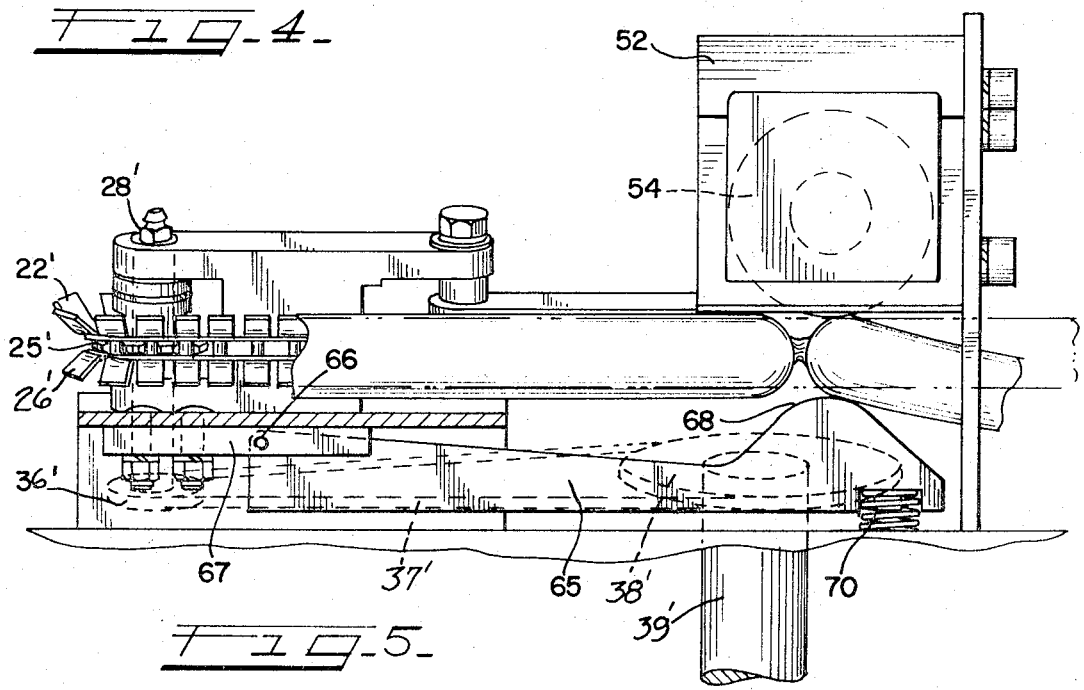
FIG. 5 is a fragmentary view, to a greatly enlarged scale, showing a portion of FIG. 1.

The mechanism 14 at the entrance end of the machine is supported on angle brackets 18 and includes a tubular member 20 constituting a part of the steam chamber through which steam is circulated by suitable connection with a steam line. The tubular member 20 and the extension 21 thereon are aligned so as to guide the sausages in a path extending between the confronting runs of a pair of sausage gripping conveyors 22 and 22'. The conveyors 22 and 22' are of identical construction and are arranged on opposite sides of the path of the sausages with each conveyor assembly being mounted for adjustment laterally of the machine in the same manner. The conveyor 22 comprises a chain 23 carried on end sprockets 24 and 25 with a series of sausage gripping elements or fingers 26 spaced along the same. The sprockets 24 and 25 are mounted on vertically extending shafts 27 and 28 which are journaled in supporting blocks 30 and 31 with the latter being connected by a bar member 32. The blocks 30 and 31 are slidably mounted for adjustment laterally of the path of the sausages on tracks or guideways (not shown) in mounting brackets 33 and 34 at opposite ends of the mechanism 12 and the thumb screws 35 provide for manual adjustment of the blocks 30 and 31 so as to position the chain 23 for carrying the sausage gripping fingers 26 in the proper path to engage between the confronting runs of the two conveyors the successive sausage links. One of the sprocket carrying shafts 28 is extended at the bottom so as to carry a drive sprocket 36 which is connected by chain 37 with a sprocket 38 on the upper end of the shaft 39 which is mounted by means of bearings 40 and 40' in a portion 41 of the housing 10 and carries at its bottom end a worm gear 42 which engages a worm 43 (FIG. 1) on a power shaft 44. The power shaft 44 is journaled in bearings 45 and 45' in the housing 10 and has a coupling 46 connecting the same with the output shaft 47 on a drive motor 48 mounted in the housing 10 beneath the entrance end of the machine. The conveyor 22' has the same construction as the conveyor 22 and is driven in like manner through a vertically disposed shaft 39' having like connections with the main drive shaft 44. Parts of conveyor 22' and the drive connections therefor which are the same as for the conveyor 22 are indicated by the same numerals primed. The shafts 39 and 39' are inclined slightly toward each other as shown in FIG. 3 with the gripping conveyors 22 and 22' operating in planes tilted slightly relative to a horizontal plane as shown in FIGS. 2 to 4. The main drive shaft 44 also drives the husking mechanism 16 through a belt drive and pulley connection indicated at 50.

A casing slitting assembly 52 is mounted on an inverted U-shaped bracket 53 at a point intermediate the end supporting sprockets for the conveyors 22 and 22' which advance the sausages. The slitting assembly 52 comprises a slitting blade in the form of a disc 54 having a cutting edge 55 (FIG. 6) which is mounted for rotation on the end of the output shaft 55 of an air motor 56 mounted on the bracket 53 so that the cutting edge 55 of the blade 54 travels in a path which extends through a slot 58 in the anvil forming bottom face 60 of the housing 61 which forms part of the assembly 52. The portion of the anvil face immediately adjoining the slot 58 extends below the main portion of the housing face 60 (FIG. 3) so as to provide a relatively narrow rib-like section 62 with a slotted bottom face 63. The air motor 56 is adjustable vertically in the housing 61, with a micrometer adjustment (not shown) so as to provide adjustment of the blade edge 55 relative to the sausage engaging surface immediately adjacent the blade edge. This enables the blade to be adjusted so as to cut the casing to a depth corresponding to the thickness of the casing without cutting the skin of the sausage over which the casing lies.

A sausage lifting arm 65 (FIGS. 1, 2, 3 and 5) is arranged beneath the path of advance of the sausages with the end thereof pivotally mounted at 66 on a bracket 67 supported on the housing 10. The arm 65 extends to a point immediatey beneath the blade 54 and includes an upwardly bulging curved surface 68 over which the sausages ride as they pass beneath the housing surface 60. A compression spring 70 urges the sausage engaging end of the lift arm 65 in an upward direction so as to hold the sausages in engagement with the slotted face 63. The sausage engaging face 63 is positioned somewhat higher than the normal path of the sausages as they are advanced by the gripper conveyor 22, 22' and the arm 65 lifts the sausages into engagement with the surface 63. The chains 23, 23' are tensioned so that the confronting runs thereof intermediate the supporting end sphockets are sufficiently loose to permit the lift arm 65 to raise the sausages somewhat above the normal path thereof. This insures that the blade 54 will cut the casings throughout a maximum portion of the length of each sausage.

I claim:

1. A mechanism for removing the casing from a plurality of connected links into which a stuffed casing has been divided comprising means for advancing the connected links in end-to-end relation and in a predetermined path, an anvil-like member mounted at a casing slitting station along said path which anvil member has a surface portion positioned for engagement by the outer surface of the casing which encloses the links said anvil member having a relatively narrow slot extending in said surface portion and in the direction of the path of advance of the links, means disposed opposite said casing engaging anvil portion for resiliently holding the links in engagement with said anvil member so that the outer surface of the casing engages said anvil portion and a casing slitting means mounted in said slot with a cutting edge thereof extending outward of the face of said anvil member in the direction of the links a sufficient distance to penetrate the casing which lies on the surfaces of the links so as to slit the casing and permit subsequent removal of the successive links therefrom.

2. A mechanism as set forth in claim 1, and said anvil member having a relatively narrow rib-like portion positioned for engagement by the outer surface of the casing which encloses the links with said slot in which said slitting means is mounted being disposed intermediate the side edges thereof.

3. A mechanism as set forth in claim 1 and said means for holding the links in engagement with said anvil member comprising an elongate member pivotally mounted at one end and having a rounded surface portion on the other end which bulges in the direction of the links and which is disposed for engaging the links at a point opposite said anvil slot and resilient means for urging the rounded surface portion in the direction of said anvil slot so as to insure slitting of the casing at the rounded ends of the links.

4. A mechanism as set forth in claim 1 and said means for advancing the connected links comprising a pair of endless traveling conveyors each having link engaging fingers, said conveyors being disposed for operation in generally horizontal planes which are angularly related, which are parallel with the path of travel of the links and which engage the links along their length and on opposite sides of said casing slitting means and hold the links in alignment relative to said slitting means.

5. A mechanism as set forth in claim 1 and said casing slitting means comprising a rotating disc disposed with the cutting edge projecting from said slot only a small distance which is sufficient to cut through the casing when the casing is pressed against the opposed face of said anvil member from which said cutting edge projects.

6. A mechanism as set forth in claim 5 wherein said rotating disc is mounted on the output shaft of a motor drive member so that the cutting edge of said disc turns in a path having a portion projecting a constant predetermined distance from the face of the anvil which is engaged by the casing, and said motor drive member having a means for adjusting the position of the cutting blade in the anvil slot so as to cut through the casing thickness only and to adapt the mechanism for adjustment for severing casings of different thickness.

References Cited
UNITED STATES PATENTS

| | | | |
|---|---|---|---|
| 2,360,363 | 10/1944 | Pope | 17—(1 FUX) |
| 2,644,979 | 7/1953 | Ball | 17—1(F) |
| 2,779,968 | 2/1957 | Hensgen | 17—1(F) |

LUCIE H. LAUDENSLAGER, Primary Examiner